May 22, 1951

R. M. COHEN 2,553,812

SCRIBER

Filed Oct. 16, 1946

Inventor
ROBERT M. COHEN
By
Irving Seidman
Attorney

May 22, 1951  R. M. COHEN  2,553,812
SCRIBER
Filed Oct. 16, 1946  3 Sheets-Sheet 2
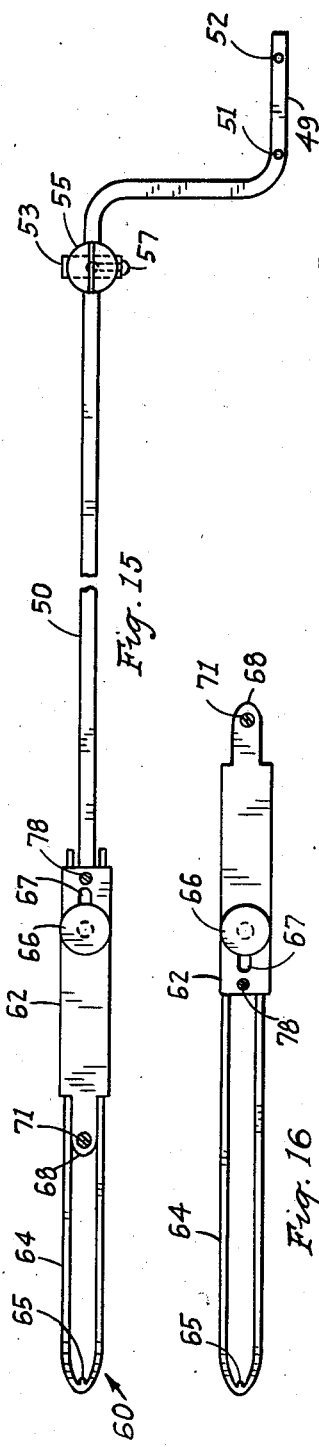
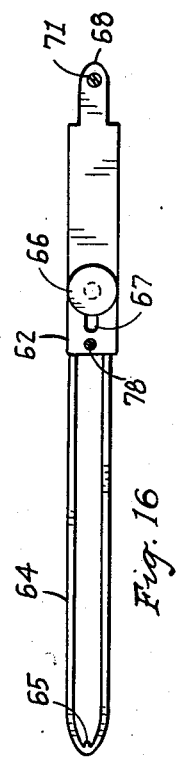
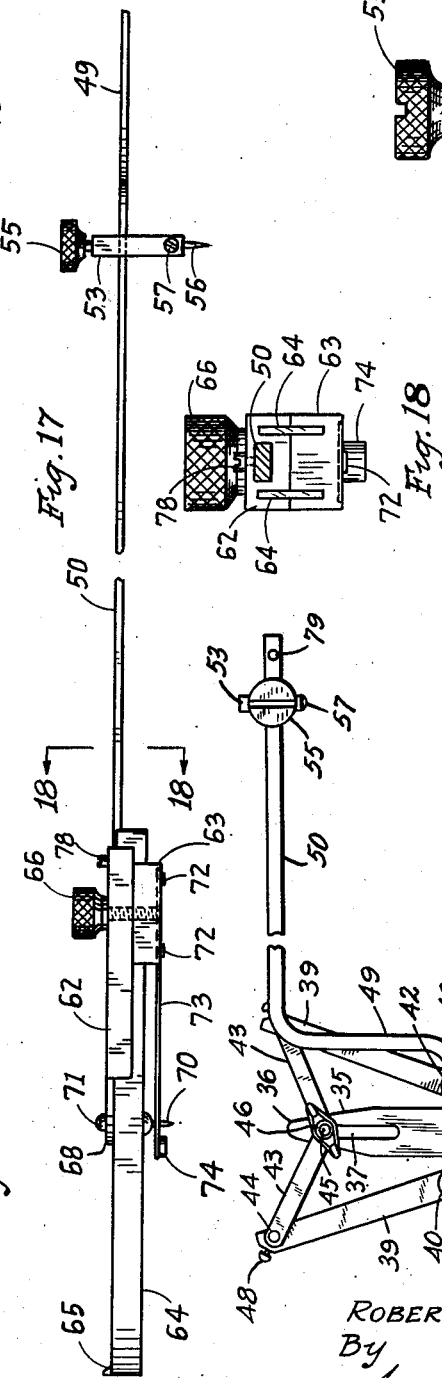
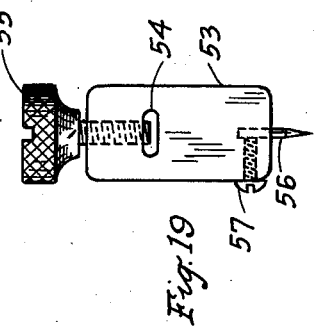
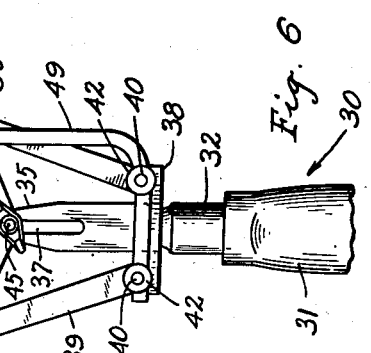
Inventor
ROBERT M. COHEN
By
Irving Seidman
Attorney May 22, 1951  R. M. COHEN  2,553,812
SCRIBER
Filed Oct. 16, 1946  3 Sheets-Sheet 3

Inventor
ROBERT M. COHEN
By
Irving Seidman
Attorney

Patented May 22, 1951

2,553,812

UNITED STATES PATENT OFFICE 2,553,812

SCRIBER

Robert M. Cohen, College Point, N. Y.

Application October 16, 1946, Serial No. 703,666

4 Claims. (Cl. 33—27)

This invention relates to a scriber particularly adapted for scribing or marking parallel lines upon linoleum or other material so that an inlay strip may be inserted, usually of another color.

Broadly, it is an object of my invention to provide a simple device which can accurately and speedily score parallel lines in order to cut feature stripping from a larger piece of linoleum or other material.

Still another object of my invention is to provide a device for scribing or marking linoleum or other material in such a manner so that the marking points or needles are exposed to the view of the operator in order to provide better working conditions and greater accuracy.

Another object of my invention is to provide a device for scribing parallel lines upon linoleum or like material permitting the tool to be either pushed or pulled so that the scoring lines can run close to any obstructions that may be encountered, such as a transverse wall. I have therefore spaced my scoring needles the same distance from the outside edges and the same distance from the longitudinal medial line.

Still a further object of my invention is to provide automatic means for spacing the scribing needles in variable and predetermined widths from each other maintaining uniform distance at all times from the longitudinal medial line.

Another object of my invention is to provide a handle of such size and weight as to present a balanced tool for the user.

Another object of my invention is to provide a storage compartment within the handle for storage of extra needles to be used in connection with the scribing tool.

Another object of my invention is to provide a radius bar that can be readily used in connection with my scribing tool in order to score parallel circles of predetermined widths.

Another object of my invention is to provide a scribing tool which has an exceptional wide range so that parallel lines may be scribed both close to a guide edge and far away from same.

Still a further object of my invention is to provide a common radius bar which may be employed with my scribing tool and the modification of same.

Still another object is to provide a radius bar to which scribing tools may be attached to both ends in order to make a multiplicity of scribing lines upon linoleum or other like material.

For a fuller understanding of the nature and objects of my invention, reference is had to the following detailed description in connection with the accompanying drawings, in which:

Figure 6 is a top view of the scriber attached to a radius bar.

Figure 15 is a top view of the scribing tool shown in Figures 7 to 14 inclusive used with the radius bar shown in Figure 6.

Figure 16 is a top view of the scribing tool shown in Figures 7 to 15 inclusive in reversed and extended position.

Figure 17 is a side elevation of the tool and radius bar shown in Figure 15.

Figure 18 is an enlarged end view taken along line 18—18 of Figure 17.

Figure 19 is an enlarged front view of the pivot pin bracket used in connection with the radius bar.

Figure 2:
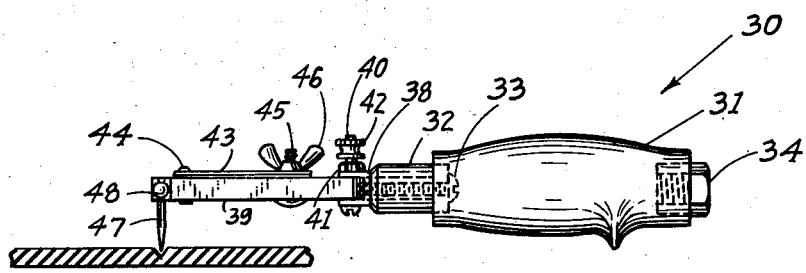
Figure 2 is a side elevation.
Figure 1:
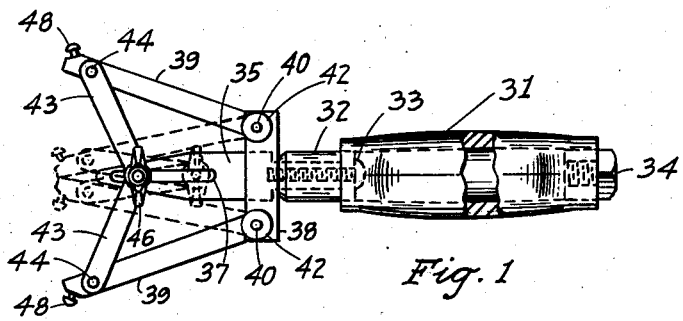
Figure 1 is a top view of a scriber, the marking points being in extended position, the dotted lines indicating the retracted position.
Figure 5:
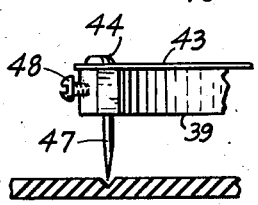
Figure 5 is an enlarged fragmentary front view of one of the scribing arms.
Figure 3:
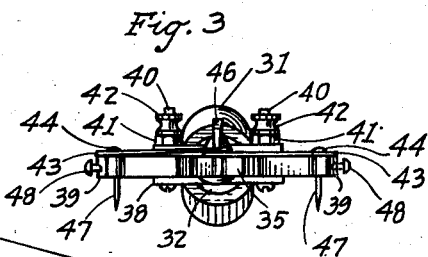
Figure 3 is a front view of the scriber shown in Figure 1.
Figure 4:
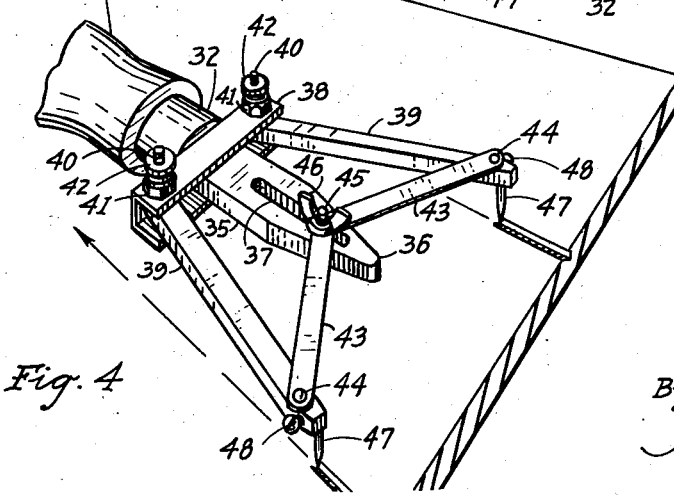
Figure 4 is a perspective view.
Figure 7:
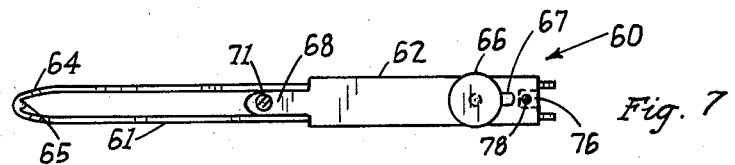
Figure 7 is a top view of a modified scriber which can be used alone or in connection with the radius bar and scriber described in the previous figures.
Figure 8:
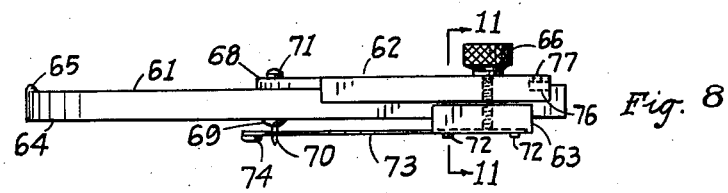
Figure 8 is a side view of the scribing tool shown in Figure 7.
Figure 9:
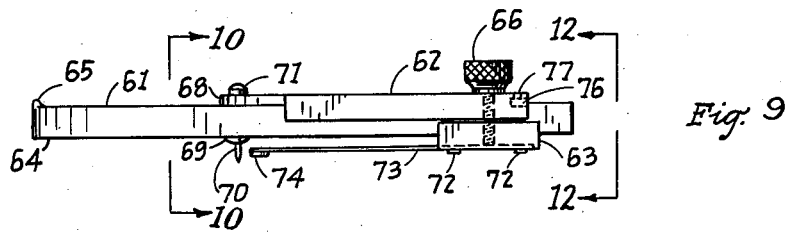
Figure 9 is a side view of the scriber shown in Figures 7 and 8 with the scribing point in forward position.
Figure 10:
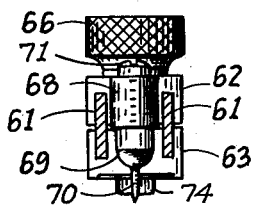
Figure 10 is an enlarged view taken along line 10—10 of Figure 9.
Figure 11:
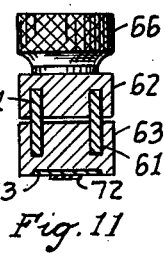
Figure 11 is an enlarged view taken along line 11—11 of Figure 8.
Figure 12:
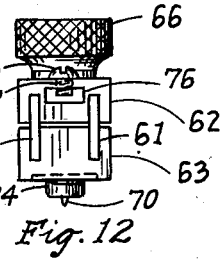
Figure 12 is an enlarged view taken along line 12—12 of Figure 9.
Figure 13:
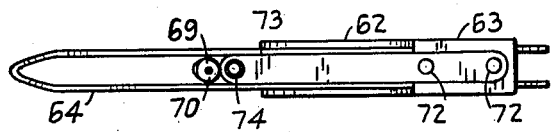
Figure 13 is a bottom view of the scriber in the position shown in Figure 9.
Figure 14:
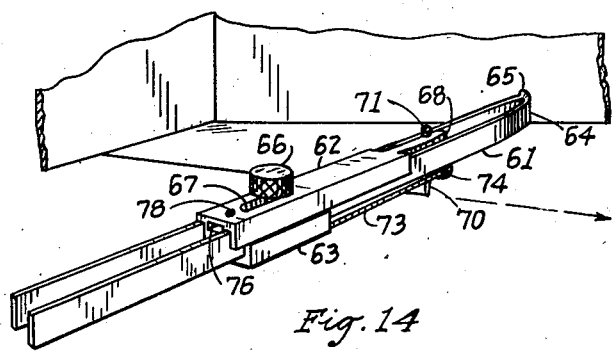
Figure 14 is a perspective view showing the tool used in scribing a piece of linoleum and using the baseboard as a guide.

Referring to the drawings, numeral 30 represents a scriber having a hollow handle 31 which is attached to an extension 32 by means of a screw 33. The rear of the handle has a threaded opening leading to the interior compartment of the handle for storing extra needles. The rear opening of the handle is closed by a threaded screw 34. A central member 35 having an interiorly threaded end extends through extension 32 and is held in position by the screw 33. The opposite end of the central member 35 has a tapered end 36, tapered on both sides of the central line at the same angle. A slot 37 runs along the longitudinal medial line of central member 35. Between central member 35 and extension 32 is a U-shaped bar 38 which is held in rigid position by the tightened screw 33. A pair of opposed pivoted bars 39 are attached to each end between the U-shaped bar 38 by screws 40 and nuts 41, permitting bars 39 to pivot laterally. Knurled threaded screw caps 42 are seated upon screws 40. A pair of rigid pivoted bracket arms 43 are pivotally fastened at the opposite ends of bars 39 by pivot pins 44, the opposite ends of bracket arms 43 having arms overlapping one another so that screw 45 may pass through the hollow of said bracket arms 43, the said screw 45 passing through the slot 37. A wing nut is seated upon screw 45 to fix the movement of bars 39 and bracket arms 43. The extreme ends of bars 39 have openings to permit the insertion of needles 47 which are rigidly held in position within said openings by threaded screws 48. By loosening wing nut 46, bars 39 may be either spread, as shown in Figure 1, or retracted, as shown by the dotted lines in Figure 1, to spread the needles 47 to certain predetermined desired widths or spacings. The movement of the screw 45 longitudinally within the slot 37 will close the bars 39 to spread the needles the same distance from the longitudinal medial line, since the bracket arms 43 are of the same length.

In order to scribe parallel lines, the end of one of the bars 39 is moved against a straight edge bracket (not shown) and the scriber 30 moved parallel to the straight edge, thus causing the needles 47 to scribe parallel lines. If an obstruction appears, such as a projection in the corner of a room, the scriber 30 can be reversed since the scribing needles 47 are operated the same distance from the outer edge of bars 39 and from the longitudinal medial line of the scriber.

In the event it is desired to scribe parallel circles the knurled screw caps 42 are removed and the radius bar 49 is attached. Radius bar 49 has a right angle bend so that the long arm 50 is approximately in line with needles 47. The short end 49 has two holes 51 and 52 spaced apart the same distance as screws 40. The opposite end has a hole 79 adjacent the end. In order to attach the radius bar the screws 40 are passed through holes 51 and 52 and the caps 42 are then fastened in position upon screws 40. A pivot pin bracket 53 having a substantially rectangular opening 54 adapted to receive long arm 50 is movably positioned upon the arm 50 and fixed thereon by knurled screw 55 which is sufficiently long to pass into opening 54. At the lower end of bracket 53 there is an opening for a needle 56 which is firmly positioned by screw 57. In order to cut a circle or arc of a predetermined radius bracket 53 is moved along arm 50 until the point of the needle 56 is the desired distance from the needles 47. The screw 55 is then tightened and using needle 56 as the pivot, the tool 30 is then moved about pivot 56 so that the point of needles 47 contact the surface of the linoleum or other material, thus scribing arcs or circles of desired radius.

Referring to Figures 7 to 17 inclusive, numeral 60 represents a modified scriber comprising an elongated U-shaped member 61 upon which is seated an upper member 62 and a lower member 63. The looped portion 64 of U-shaped member 61 has a slight projection 65 so that it can be used to make scribing lines on certain irregular surfaces. The upper member 62 and lower member 63 have opposed grooves to slideably receive the legs of the U-shaped member 61. A knurled screw 66 passes through slot 67 in the upper portion of member 62 and into a threaded hole in the lower member 63. By tightening or loosening screw 66 upper or lower member 62 and 63 may be moved with relation to each other and rigidly fastened to U-shaped member 61. Upper member 62 has an extension 68 which slides within the U-shaped member 61. Extension 68 has a chuck 69 for receiving a needle 70. Chuck 69 is held in position by screw 71. The lower member 63 has attached to the bottom thereof by rivets 72 a flexible arm 73. An extension 74 is attached to the end of arm 73. Arm 73 has an opening adjacent its unattached end and adjacent extension 74. As will be noted in Figure 8, needle 70 passes through this opening. If it is desired to pass needle 70 in front of extension 74, the screw 66 is loosened and upper member 62 is moved inwardly upon the U-shaped member while arm 73 is flexed downwardly to permit the needle to pass out of the opening in the flexible arm. Screw 66 is then tightened at any desired distance between the needle 70 and the front of extension 74. If it is desired to scribe a line upon the tread of a stair, extension 74 can be run along the nosing of the tread, while the needle 70 scribes a line along the linoleum or other material laid upon the stair, in the position shown in Figure 9.

The upper member 62 has an opening 76 at its rear end adapted to receive an end of the long arm 50 of the radius bar. A threaded opening 77 through which screw 78 passes, firmly attaches the end of the arm 50 of the radius bar through hole 79 to the scriber 60, as shown in Figures 15 and 17. The pivot pin bracket 53 may be moved along arm 50 so that the needle 56 is spaced the desired distance from the needle 70 and using needle 56 as a pivot point, a circle or arc may be scribed.

Referring to Figure 16, if it is desired to scribe a line at a further distance from a baseboard, using looped portion 64 of the U-shaped member 61 as a guide, the upper and lower members 62 and 63 may be reversed and seated upon the legs of the U-shaped member 61, so that the needle 70 is at a further distance from the loop 64, such distance being set by tightening the screw 66.

By use of my compact scribers either individually or affixed to the radius bar either singly or in combination, a large variety of scribed lines can be made in parallel relationship and at a greater distance apart than heretofore known in the field of scribing upon linoleum or other surfaces.

It is obvious that various changes and modifications may be made in the details of construction and the arrangement of parts without departing from the general spirit of the invention.

I claim:

1. A scriber of the character described, comprising a handle, an extension from one end of said handle, a central member tapered towards its end, said central member being attached to said extension and located along the medial line of said handle and said extension, a slot along the longitudinal medial line of said central member, a slidable screw movable within said slot and adapted to be locked in any position therealong, a supporting bar rigidly held between said central member and said extension, a pair of opposed pivoted bars attached one to each end of said supporting bar permitting said pivoted bars to pivot laterally, a pair of pivoted members each pivoted at one of its ends to the free end of one of said pivoted bars, the opposite end of said pivoted members being attached to said slidable screw, said slidable screw movable in said slot for fixing said pivoted members against movement and for separating and contracting said pivoted bars equally distant from the medial line of said central member and a removable marking pin at the end of each of said pivoted bars.

2. A scriber of the character described, comprising a hollow handle, a removable cap for said hollow handle, a central member attached to said handle, said central member having a tapered end, a longitudinal central slot in said central member, a slidable screw movable within said slot and adapted to be locked in any position therealong, a supporting bar at right angles to said central member and attached between said central member and said handle, a pair of pivoted bars each pivoted at one end to an end of said supporting bar, a removable marking pin at the free end of each said pivoted bar, a pair of pivoted members pivoted at their ends and attached one to the free end of each of said pivoted bars, the opposite end of said pivoted members being attached to said slidable screw, said slidable screw riding within the slot of said central member, a wing nut for rigidly positioning said screw at predetermined positions along said slot for fixedly positioning said marking pins.

3. A scriber of the character described comprising a hollow handle having a threaded opening at one end, a threaded closing member for closing said threaded opening, a projection from the opposite end of said handle, a supporting member rigidly attached to said projection, a central member having equal tapers at the end thereof, a central slot along the longitudinal medial line of said central member, means for attaching said central member and said supporting member to said handle, a pair of pivoted bars each pivotally attached at one end to an end of said supporting bar, a marking pin removably attached at the free end of each of said pivoted bars, a pair of pivoted guide members pivotally attached one at the free end of each, said pivoted bars, the opposite ends of said guide members overlapping one another, a slidable screw positioned in said slot, the overlapping ends of said guide members being positioned upon said slidable screw, means for firmly positioning said slidable screw upon said central member and screw caps at each end of said supporting member for receiving a radius bar.

4. A scriber of the character described comprising a hollow handle having a threaded opening at one end, a threaded closing member for closing said threaded opening, a projection from the opposite end of said handle, a supporting member rigidly attached to said projection, a central member having equal tapers at the end thereof, a central slot along the longitudinal medial line of said central member, means for attaching said central member and said supporting member to said handle, a pair of opposed pivoted bars each pivotally attached at one end to an end of said supporting bar, a marking pin removably attached at the free end of each of said pivoted bars, a pair of pivoted guide members pivotally attached at the end of each of said pivoted bars, the ends opposite the attached ends of said guide members overlapping one another, a slidable screw positioned in said slot, the overlapping ends of said guide members positioned upon said slidable screw, means for firmly positioning said slidable screw upon said central member, screws and screw caps at each end of said supporting member for receiving a radius bar, a radius bar comprising a flat arm, a slidable block, a channel in said block for slidably receiving said radius bar, a threaded opening communicating with said channel, a threaded screw within said threaded opening for positioning said block upon said bar, a removable center pin at the end of said block opposite said threaded screw, means for fixedly positioning said center pin within said block, a pair of spaced holes at one end of said bar, said pair of spaced holes in said bar for attaching said bar upon said screws and beneath said screw caps of the scriber to attach said bar to said scriber.

ROBERT M. COHEN.

REFERENCES CITED

The following references are of record in the file of this patent:

UNITED STATES PATENTS

| Number | Name | Date |
|---|---|---|
| 611,625 | Goddard | Oct. 4, 1898 |
| 621,064 | Gibbs | Mar. 4, 1899 |
| 2,176,733 | Fanning | Oct. 17, 1939 |
| 2,274,727 | Neiss et al. | Mar. 3, 1942 |
| 2,427,011 | London | Sept. 9, 1947 |